United States Patent [19]
Owens et al.

[11] Patent Number: 6,059,483
[45] Date of Patent: May 9, 2000

[54] SEALED JOINT FOR A MULTI-COMPONENT INJECTION MOLDED AUTOMOTIVE LAMP ASSEMBLY

[75] Inventors: Dale Douglas Owens, Bellvue; Ronald Dennis Polley; David Oren Hunt, both of Sandusky, all of Ohio

[73] Assignee: Ford Motor Company, Dearborn, Mich.

[21] Appl. No.: 09/128,261

[22] Filed: Aug. 3, 1998

[51] Int. Cl.[7] .................................................. F21V 31/02
[52] U.S. Cl. .......................... 403/267; 403/268; 264/261; 264/263; 156/108; 362/267
[58] Field of Search .................... 403/265, 266, 403/267, 268, 269, 336, 375; 264/261, 263; 156/108; 362/267, 546, 310

[56] References Cited

U.S. PATENT DOCUMENTS

| | | | |
|---|---|---|---|
| 3,635,280 | 1/1972 | Parsons | 164/246 |
| 3,919,034 | 11/1975 | Carini | 156/304 |
| 3,970,401 | 7/1976 | Lubeck | 403/265 |
| 4,031,677 | 6/1977 | Tantlinger | 403/267 X |
| 4,118,266 | 10/1978 | Kerr | 156/293 |
| 4,183,778 | 1/1980 | Mesnel | 156/245 |
| 4,191,606 | 3/1980 | Evans | 156/288 |
| 4,814,950 | 3/1989 | Nakata | 362/61 |
| 4,912,826 | 4/1990 | Dixon et al. | 29/281.1 |
| 5,072,348 | 12/1991 | Tsukada | 362/267 X |
| 5,188,444 | 2/1993 | Makita et al. | 362/267 X |
| 5,321,594 | 6/1994 | Hegemann et al. | 362/267 |
| 5,413,743 | 5/1995 | Prophet | 264/1.7 |
| 5,424,874 | 6/1995 | Ishikwawa et al. | 362/310 X |
| 5,442,525 | 8/1995 | Tsukada | 362/267 X |
| 5,552,970 | 9/1996 | Takezawa et al. | 362/267 X |
| 5,560,706 | 10/1996 | Yamakazi et al. | 362/267 |
| 5,562,338 | 10/1996 | Yamamoto | 362/61 |
| 5,599,415 | 2/1997 | Tomic et al. | 156/159 |
| 5,670,108 | 9/1997 | Kern et al. | 264/248 |
| 5,670,109 | 9/1997 | DeRees | 264/261 |
| 5,673,992 | 10/1997 | Schmitt | 362/267 X |

*Primary Examiner*—Terry Lee Melius
*Assistant Examiner*—John R. Cottingham
*Attorney, Agent, or Firm*—Roger L. May; Damian Porcari

[57] ABSTRACT

A plastic joint for an automotive lamp assembly (10) has a housing (14) containing a tongue (20) and lens (12) containing a groove (18) to accept the tongue. The tongue or the groove can provide a channel for a thermoplastic material that is a bonding agent between the tongue and groove. The channel can also be formed by making the tongue narrower than the groove or by providing protrusions or depressions on the tongue or groove. The joint is formed by assembling the housing and lens and injecting the thermoplastic material into the channel in the joint. When the thermoplastic material cools, a bond is formed between the tongue and groove that fastens the lens and housing together.

5 Claims, 3 Drawing Sheets

SEALED JOINT FOR A MULTI-COMPONENT INJECTION MOLDED AUTOMOTIVE LAMP ASSEMBLY

TECHNICAL FIELD

This invention related generally to joints for multi-component injection molded articles, and, more particularly to a sealed joint for joining plastic lens components together for automotive lamp assemblies.

BACKGROUND OF THE INVENTION

With the increased use of plastic components in automobile manufacturing instead of metal components, manufacturing cycle time has decreased even as component configurations have become more intricate. Plastic components can be surface finished to resemble the metal components they replace while reducing weight, reducing waste, and containing manufacturing cost. For example, automotive lamp assemblies once constructed of glass and metal with inherent problems of sealing the metal to glass interface can now be constructed of plastic with weather tight seal.

Typically, a lamp assembly includes a lamp housing and a lens that is secured to the lamp housing by an adhesive or by a seal bead. Older lamp assemblies had the lens secured to the housing by an adhesive. While adhesives worked to provide a seal, they had the disadvantage of requiring time to cure which increased manufacturing time, thereby increasing cost. Adhesive applied before components are assembled also poses a glue squeeze out problem requiring time for clean up. U.S. Pat. No. 5,670,109 which issued Sep. 23, 1997 to DeRees remedied the glue squeeze out problem in some applications by low pressure injection of the adhesive. Recently, the adhesive has been displaced by a seal bead formed of a thermoplastic material introduced during the injection molding process which fastens the lens to the housing without increasing cycle time.

U.S. Pat. No. 5,413,743, which issued May 9, 1995, to P. A. Prophet discloses a lamp assembly that has a plastic housing and plastic lens molded in a rotary transfer molding machine. The rotary transfer molding machine has upper and lower mateable housing dies and upper and lower mateable lens dies in which the housing and the lens are molded simultaneously. The machine is then indexed so that the upper housing die with the molded housing retained in it is mated with the lower lens die with the molding lens retained in it. These two dies are configured so that an annular seal bead cavity is formed at an interface of the dies. A seal bead is then molded to join the molded housing to the molded lens to provide the lamp assembly. The machine is indexed again so that the upper housing die with the lamp assembly retained in it is mated with an overlay die and a decorative overlay is molded on the peripheral margin of the lens. The lens is attached to the housing by an annular seal bead that joins the perimeter of the lens to a peripheral flange at an opening of the lamp housing.

A problem with the rotary transfer molding process is that it requires a rotary transfer molding machine, and it requires that both members to be joined be formed at the same time. Manufacturing both members to be joined in a single machine at the same time may not result in the lowest cost for each component, and may increase machinery complexity. Accordingly, it is desirable to have a process for joining two components regardless of when or where the components were formed.

In the rotary transfer molding machine, the dies are configured so that a seal bead cavity is formed at the interface where the two dies are mated. The seal bead is then molded, joining the molded housing to the molded lens at the interface of the dies to provide the lamp assembly. The dies of the rotary transfer molding machine are required to provide support for the housing and lens while the bead is being formed. Because the two components to be joined are always retained in the rotary transfer molding machine, there is little difficulty with manufacturing tolerances; however, retaining the components to be joined in the machine at all times until the lamp assembly is fully assembled, does not allow for modification or processing of the interior surfaces of the lamp assembly prior to sealing. Accordingly, it will be appreciated that it would be highly desirable to manufacture a lamp assembly without having to invest in machinery of this cost and complexity. It is also desirable to have a joint that is versatile enough to compensate for manufacturing tolerances and which is rigid enough to form the joint without collapsing.

SUMMARY OF THE INVENTION

The present invention is directed to overcoming one or more of the problems set forth above. Briefly summarized, according to one aspect of the present invention, a sealed plastic joint for joining first and second members together includes a tongue assembly attached to the first member, and a groove assembly attached to the second member. The tongue assembly has a base member with a tongue extending from the base member, and the groove assembly has spaced apart groove walls defining a groove therebetween. The groove receives the tongue to join the first and second members together. The surfaces of the tongue and groove define a channel which receives a thermoplastic bonding agent that bonds the tongue and groove together and forms a seal between them and between the first ands second members.

According to another aspect of the invention, a method for joining a first member and a second member with a sealed joint comprises forming a first member having a tongue, forming a second member having a groove for receiving the tongue, fitting the first and second members together so that the tongue extends into the groove creating a channel between surfaces of the tongue and the groove, injecting molten thermoplastic material into the channel, and cooling the thermoplastic material thereby effecting a bond between the first and second members.

The sealed joint can be formed much faster using a thermoplastic bonding agent than an adhesive because of the longer curing time required for adhesives suitable for the joint. When tongue flanges are used, they engage the groove walls to support them during filling with the heated thermoplastic bonding agent. Flexible grove walls help compensate for manufacturing deviations and for distortion due to handling or storage.

Existing manufacturing equipment can be used to form the joint thereby eliminating the need to invest in new equipment. The components to be joined can be manufactured at any time and joined when desired so that use of existing manufacturing equipment can be optimized.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
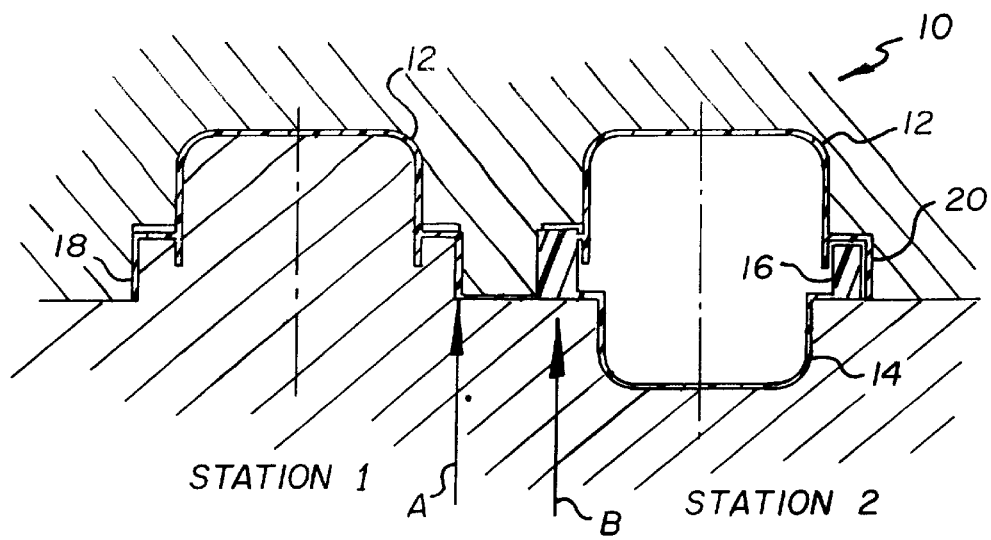
FIG. 1 is a diagram illustrating the joining of two plastic components using molten plastic to bond two components together.

Referring to FIG. 1, a plastic assembly, such as lamp assembly 10, is illustrated being manufactured. The assembly is a two-step process where a first component such as lens 12 is injection molded at station 1 and a second component, such as housing 14, is injection molded at station 2 and joined to the lens 12 with a seal ring 16. The lens 12 has a U-shaped groove 18 for receiving an L-shaped flange or tongue 20 that extends from the housing 14. The short leg of the "L" extends toward the bottom of the "U" and fits loosely in the "U" so that close manufacturing tolerances are not required. Plastic for the lens may be injected along an edge as indicated by arrow "A" and plastic for the seal ring 20 may be injected as indicated by arrow "B".

Figure 2:
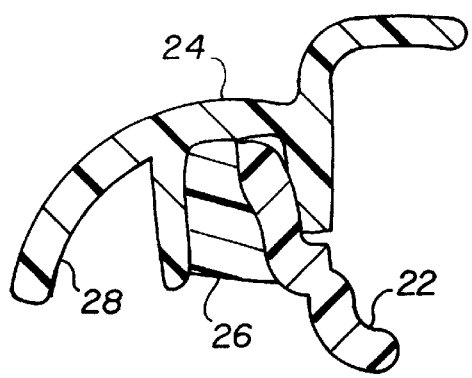
FIG. 2 illustrates a joint similar to the joint of FIG. 1, but featuring an overhung lens, U-groove and flange joints instead of a U-groove and L-shaped flange.

FIG. 2 illustrates a joint for an overhung lens wherein the L-shaped tongue has a curvilinear configuration contrasted with the rectangular configuration of the tongue 16. Tongue 22 contacts one sidewall of the groove while the other side of the groove receives seal ring 26. Seal ring 26 thus bonds to one sidewall and the tongue, forming a joint between the tongue and the groove which binds the lens and the housing. Lens 24 has an overhang 28 as is desired for some applications.

Figure 3:
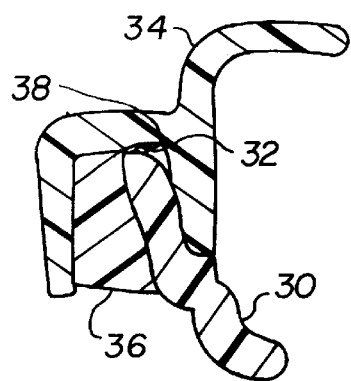
FIG. 3 is a joint similar to FIG. 2, but having a plain lens instead of an overhung lens.

FIG. 3 also illustrates a curvilinear tongue 30 that has a general inverted "L" configuration with a small protrusion 32 on a leg of the "L" facing outward toward the bottom of the groove of the lens 34. Protrusion 32 helps position tongue 30 relative to lens 34, and ensures that the tongue bottoms out in the groove to prevent material from entering the lamp between the bottom of the groove and the tongue when the injected thermoplastic material flows to create the bond between the tongue and groove. Tongue 30 abuts one sidewall of the groove, while the seal ring 36 abuts the other side of the tongue and other sidewall of the groove to bond the lens and housing together. Lens 34 may also have a slight depression or channel 38 formed in the bottom of the groove to receive the protrusion 32 which will align the lens and housing when the protrusion is seated in the channel.

Figure 4:
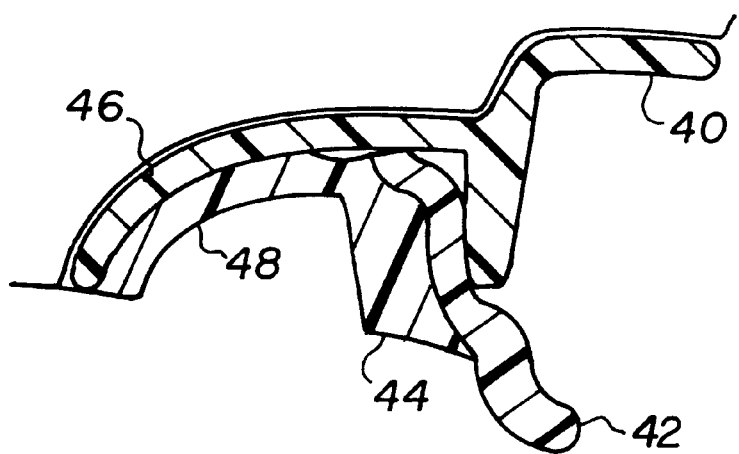
FIG. 4 is a U-groove and flange joint with an overlay on the lens for decoration.

Referring to FIG. 4, lens 40 has an overhang similar to overhang 28 of lens 24 of FIG. 2. The underside of the overhang forms part of the groove. The tongue 42 sits in the groove adjacent the non-overhanging portion of the groove and the sidewall next to it. As illustrated, the seal ring 44 extends from the tongue 42 to the extremities of the overhanging portion of the lens. A covering material 46 is applied to the front surface of the lens and an overlay material 48 is applied to the rear side of the lens on the rear side of the seal ring 44.

Figure 5:
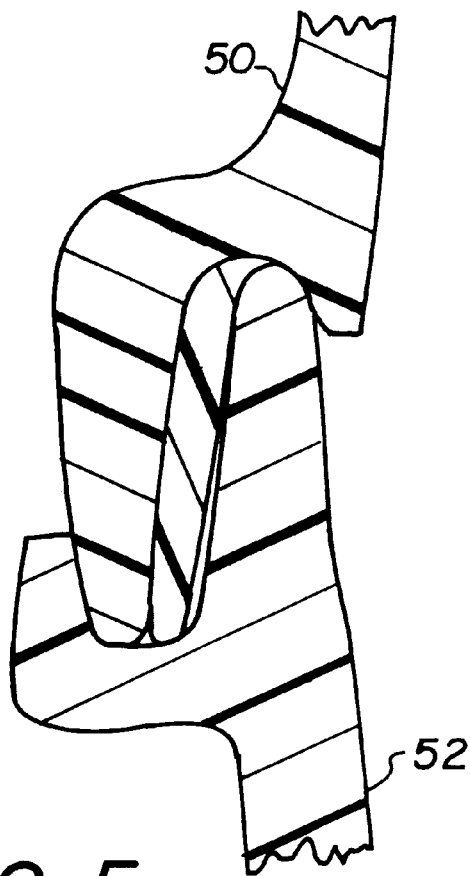
FIG. 5 is a narrower joint with dual U-grooves aped extended flanges.

Referring to FIG. 5, both the lens 50 and housing 52 are provided with J-shaped or U-shaped grooves wherein one sidewall of each "U" is longer than the other sidewall. The "U" of the lens is inverted relative to the "U" of the housing so that the longer leg of the lens "U" fits into the groove of the housing and, similarly, the longer leg of the housing "U" fits into the groove of the lens "U". The inside sidewall of the short leg of the lens "U" angles outward from the bottom of the "U" to provide a receiving surface for slidably receiving the long leg of the housing "U". The short leg of the housing "U" may also be slanted outward to slidingly receive the long leg of the lens "U" to facilitate alignment and to help form a sealed joint. The joint is finished by injecting thermoplastic material into the cavity formed between the long legs of each "U" and the bottom of the grooves. The configuration of FIG. 5 is narrower than the configuration of FIGS. 1–4 and thereby requires less thermoplastic material to form the joint. This embodiment has a greater height to width ratio than the embodiments of FIGS. 1–4, resulting in a narrower seal that requires less thermoplastic material, and that can be formed with lower clamp pressures.

Figure 6:
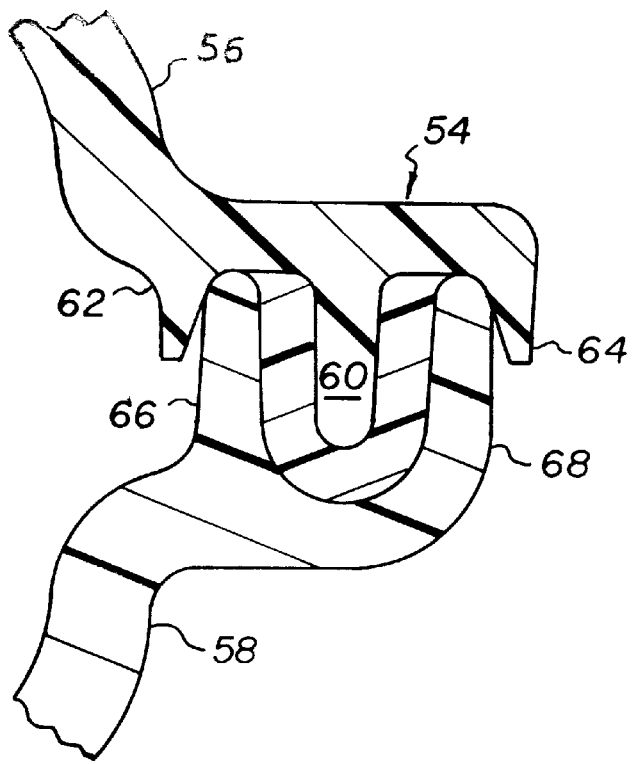
FIG. 6 illustrates a joint with flanges on the tongue to support the groove walls during bonding.

Referring now to FIG. 6, a sealed plastic joint 54 joins a lens 56 and housing 58 together. Joint 54 includes a tongue assembly that has a base member with a tongue 60 extending from the base member and a pair of flanges 62, 64 also extending from the base member on either side of tongue 60. Each flange has an inside surface facing toward tongue 60 that angles outward from its connection to the base member. Tongue 60 preferably protrudes further from the base member than the flanges 62, 64.

The groove assembly includes spaced apart groove walls 66, 68 that define a groove between them. The groove receives the tongue 60 to join lens 54 and housing 58 together. One, or both, of the tongue and groove has a channel formed therein facing the other member for receiving the thermoplastic bonding agent. The outside surfaces of groove walls 66 and 68, engage the slanted walls of the flanges 62 and 64, respectively. The slanted walls of the flanges engage the groove sidewalls and support them when the channel is being filled with hot thermoplastic material. The slanted design insures contact with the groove walls. When the lens and housing are not joined immediately after being formed, the angled surfaces of the flanges insure at least minimal contact with the groove sidewalls, and preferably provide multiple points of contact. When components are not used right away they are subject to damage or deterioration during handling and storage and the slanted flange walls will compensate for damage due to handling or storage, and also compensate for normal manufacturing deviations. As illustrated, the tongue has a smaller width than the groove to provide space for distributing the thermoplastic bonding agent along the sides of the tongue and the sidewalls of the groove.

Figure 7:
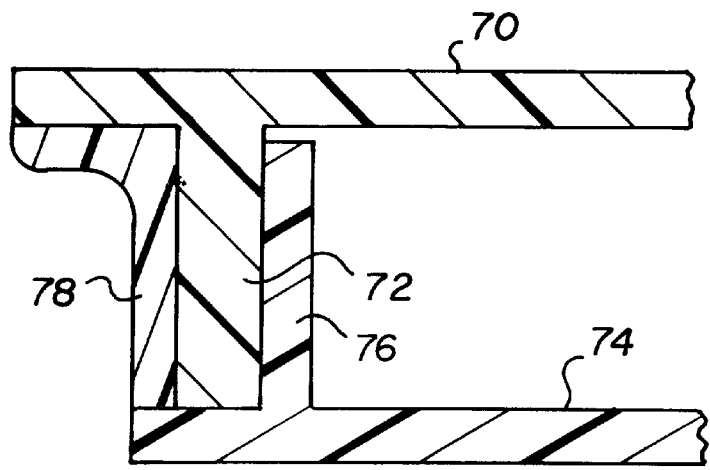
FIG. 7 illustrates a joint with a portion of the lens sandwiched between seal and housing.

Referring to FIG. 7, a lens 70 has a protrusion 72 that bottoms out against housing 74 and abuts a protrusion 76 that extends from housing 74 toward lens 70. Injected thermoplastic material forms a seal 78 that engages lens protrusion 72 opposite housing protrusion 76 so that lens protrusion 72 is sandwiched between housing protrusion 76 and seal 78. Seal 78 also engages lens 70 and housing 74. Where seal 78 engages housing 74, it seals the joint where lens protrusion 72 bottoms out against the housing.

It can now be appreciated that a plastic seal has been presented for joining first and second plastic members together. The seal includes a tongue assembly with a tongue that is received by a groove of a groove assembly. The groove assembly has spaced apart groove walls that define the groove. A channel is formed between the tongue and groove sidewalls for receiving a thermoplastic bonding agent to fill the channel and bond the tongue and groove together.

A method for joining first and second members together with a sealed joint comprises forming a first member with the first member having a tongue for joining the second member, forming a second member with the second member having a groove for receiving the tongue, fitting the first and second members together so that the tongue extends into the groove creating a channel between surfaces of the tongue and groove, injecting molten thermoplastic material into the channel, and cooling the injected thermoplastic material thereby forming a bond between the first and second members.

Existing machinery can be used with the present invention; so, new machinery is not required. The joint can be formed in one continuous manufacturing operation or components can be manufactured at different times at different locations and brought together for assembly thereby facilitating flexible manufacturing scheduling. Because the joint features flexible groove walls and angled flanges, manufacturing tolerances need not be exactly precise. Deviations are compensated for by the angle flange surfaces, flexible groove sidewalls, and the loose fit between the tongue and groove which is tightened by the seal joint. The tongue flanges also provide support for the grooved sidewalls to prevent their collapse when the thermoplastic material is injected to form the seal ring.

The purpose of the new process is to permit the joining of two thermoplastic components using molten thermoplastic material rather than an adhesive. An advantage of this process is enhanced recyclability, because the thermoplastic material is compatible with the base components. Other advantages of the process are elimination of the adhesive component which is a purchased part, possible dock-to-dock reductions through simple cooling of the thermoplastic material which eliminates the need for adhesive's cure time, and also quality improvements by reducing the possibilities of leaks at the joint.

While the invention has been described with particular reference to the preferred embodiments, it will be understood by those skilled in the art that various changes may be made and equivalents may be substituted for elements of the preferred embodiment without departing from invention. For example, while the invention has been described with reference to lamp assemblies, the method can be used for other plastic automotive assemblies. It is accordingly intended that the claims shall cover all such modifications and applications as do not depart from the true spirit and scope of the invention.

What is claimed is:

1. A sealed plastic joint for joining first and second members of an automotive lamp assembly together, comprising:

a tongue assembly attached to said first member, said tongue assembly having a base member with a tongue extending from said base member and a flange extending from said base member;

a groove assembly attached to said second member, said groove assembly having spaced apart groove walls defining a groove therebetween, said groove receiving said tongue to join said first and second members, said tongue abutting one of said groove walls, said tongue and said groove defining a channel, said flange abutting one of said groove walls, said one groove wall deforming to accept said flange creating a seal to confine said thermoplastic bonding agent;

a protrusion extending from said tongue towards said groove to contact a bottom of said groove to position said tongue assembly relative to said groove assembly; and a thermoplastic bonding agent in channel bonding said tongue and said groove together.

2. A sealed plastic joint, as set forth in claim 1, wherein said flange has an angled surface to provide multiple areas of contact with said one groove wall.

3. A sealed plastic joint for joining first and second members together, comprising:

a first groove assembly attached to said first member, said first groove assembly having spaced apart first groove walls defining a first groove therebetween, one of said first groove walls being longer than the other first groove wall;

a second groove assembly attached to said second member, said second groove assembly having spaced apart second groove walls defining a second groove therebetween, one of said second groove walls being longer than the other second groove wall, said first groove receiving said one longer second groove wall therein and said second groove wall receiving said one longer first groove wall therein while defining a channel in said grooves between said longer groove walls, each of said longer groove walls abutting a shorter adjacent groove wall; and a thermoplastic material disposed in said channel bonding said first and second members together and creating a seal therebetween.

4. A sealed plastic joint for joining first and second members of an automotive lamp assembly together, comprising:

a tongue assembly attached to said first member, said tongue assembly having a base member with a tongue extending from said base member;

a groove assembly attached to said second member, said groove assembly having spaced apart groove walls defining a groove therebetween, said groove receiving said tongue to join said first and second members;

a stop member protruding from one of said tongue and said groove in abutting contact with the other of said tongue and groove to position said tongue assembly relative to said groove assembly and create a passageway between said tongue and said groove with said stop member lying in said passageway; and a thermoplastic material in said passageway bonding and sealing said tongue and said groove together.

5. A sealed plastic joint, as set forth in claim 1, wherein said tongue is L-shaped and said groove is U-shaped.

* * * * *